Patented May 13, 1947

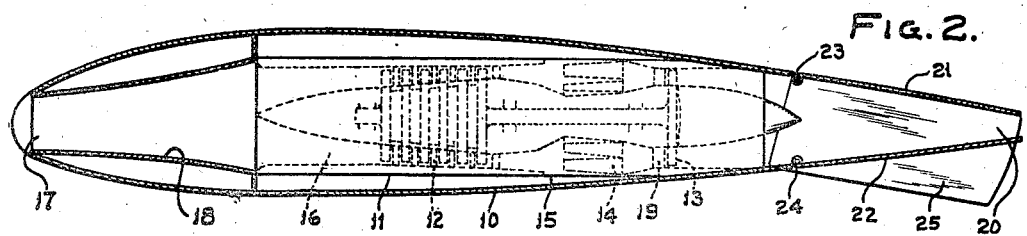
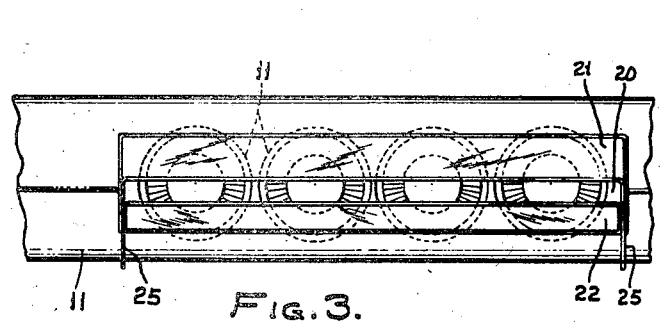
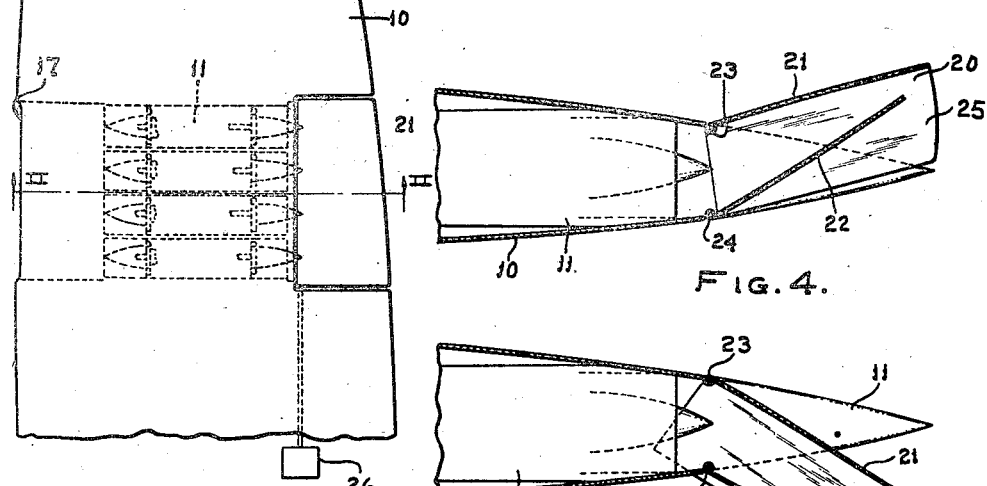
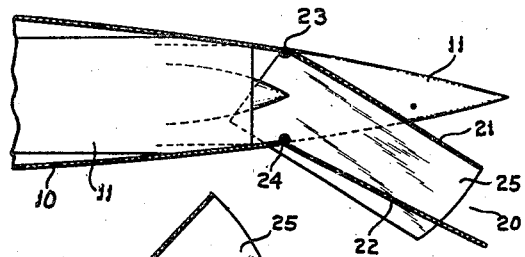
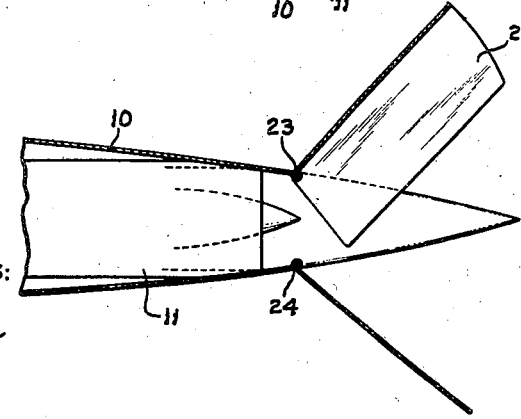

2,420,323

UNITED STATES PATENT OFFICE 2,420,323

WING-MOUNTED JET-PROPULSION SYSTEM WITH CONTROLLABLE DISCHARGE OUTLET

Charles A. Meyer, Drexel Hill, and Donald Bradbury, Prospect Park, Pa., assignors to Westinghouse Electric Corporation, East Pittsburgh, Pa., a corporation of Pennsylvania Application July 21, 1943, Serial No. 495,550

1 Claim. (Cl. 244—52)

This invention relates to aircraft and particularly to propelling and flight-controlling means therefor, and it has for an object to provide an improved device of the character set forth.

In aircraft employing jet propulsion motors installed in the wings, the problem of interference with the ailerons and wing flaps arises. In accordance with our invention, the function of the ailerons and wing flaps is accomplished by means of flaps which also define the propulsion nozzle of the motors.

These and other objects are effected by the invention as will be apparent from the following description and claim taken in connection with the accompanying drawings, forming a part of this application, in which:

Fig. 1 is a plan view of an airplane wing in which the present invention is incorporated;

Fig. 2 is a sectional view taken substantially on the line II—II of Fig. 1;

Fig. 3 is an elevational view looking at the rear or trailing edge of the wing shown in Fig. 1; and Figs. 4, 5 and 6 are views corresponding to the right-hand portion of Fig. 2 and illustrating several positions to which the flaps are movable.

In accordance with the present invention, it is proposed to mount one or more jet propulsion motors within each wing of an airplane for driving it. In Fig. 1 of the drawing, but one wing 10 of an airplane has been shown with a bank of four jet propulsion motors 11; however, it is to be understood that any desired number of motors may be employed and that the arrangement is duplicated in the opposite wing.

The jet propulsion motors 11 may comprise gas turbine power plants such as disclosed in the copending application of Stewart Way, Serial No. 482,533, filed April 10, 1943, and assigned to the assignee of the present invention. In general, each plant comprises an axial-flow air compressor 12 connected to and driven by a gas turbine 13. This turbine is driven by hot motive fluid comprising air compressed by the compressor and heated in a suitable combustion apparatus, generally indicated 14, mounted intermediate the compressor and turbine.

As shown particularly in Fig. 2, each plant is enclosed in a casing structure 15, which, together with a core structure including the compressor and turbine rotors, defines an annular flow passage 16 through the motor. The motors are mounted within the wing 10, which is open at its leading edge, as indicated at 17, for the admission of air into a duct 18 leading to the compressors 12. The air entering the compressors flows substantially straight through the motors, being compressed in the compressor, heated in the combustion apparatus, and then directed by suitable nozzles 19 to the turbine rotors. The gas on leaving the turbines is discharged as a propulsion jet through a nozzle 20 common to the bank of motors and formed in the trailing edge of the wing. The residual energy in the motive fluid discharged from the turbine is available to propel the aircraft. The nozzle opening is adjustable to vary the back pressure on the turbine and also to control the propulsion jet. The present invention is particularly concerned with the provision of flaps 21 and 22 by which the nozzle opening may be adjusted, and which also serve as ailerons and wing flaps.

The flaps 21 and 22 in one position, as shown in Fig. 2, are flush with the upper and lower wing surfaces and are hinged in the wing at 23 and 24, respectively. The flaps are movable between any of the positions shown in Figs. 2, 4, 5 and 6. The sides of the space between the upper and lower flaps 21 and 22 are closed by vertical side plates 25, carried by the upper flap and which overlaps the lower flap. While the nozzle opening 20 is shown as rectangular, it will be understood that the shape of the opening may be varied.

Movement of the flaps between the several positions illustrated may be accomplished by any suitable manually operable or automatic mechanism, shown schematically at 26.

As shown in Fig. 4, the flaps 21 and 22 may be raised and lowered together while maintaining a fixed nozzle opening to effect lateral control of the aircraft. If greater or lesser power is required, the pilot may also swing the flaps relative to each other to decrease or increase the nozzle opening. Since the flaps may be moved in this manner, in addition to serving as nozzle-adjusting means they also function as ailerons providing lateral control of the aircraft. Further, the upward or downward directing of the propulsion jet when effecting lateral control of the aircraft by means of the flaps, intensifies or augments the aileron action and reduces the tendency of the aileron action to become "sloppy" at low flight or landing speeds.

In landing the aircraft, the upper and lower flaps 21 and 22 may be lowered as shown in Fig. 5. In this case, the lower flap functions as a wing flap to increase the lift, thereby permitting a lower landing speed. With the flaps in this position, the propulsion jet is directed downwardly and serves to further increase the lift of the wings at low landing speeds.

In Fig. 6, the flaps 21 and 22 are shown wide open, so that the propulsion jet effect is at a minimum and a substantial braking effect on the aircraft is obtained. This condition or adjustment of the flaps is particularly suitable for use when the plane is in a dive.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claim.

What is claimed is:

In an aircraft, a wing having spaced upper and lower surfaces, a jet propulsion motor mounted within said wing between said upper and lower surfaces, portions of said upper and lower wing surfaces at the trailing edge thereof being hinged with respect to the main body of the wing and constituting the upper and lower walls of a jet passage in the trailing edge of said wing rearwardly of said motor, and a pair of supplementing wall members carried by one of said hinged wing portions at opposite ends thereof and constituting side walls of said jet passage, said portions being movable with respect to their respective wing surfaces for effecting maneuvering of the aircraft in flight, and being movable with respect to each other for varying the size of said jet passage to vary the back pressure on the propulsion motor.

CHARLES A. MEYER.
DONALD BRADBURY.

REFERENCES CITED

The following references are of record in the file of this patent:

UNITED STATES PATENTS

| Number | Name | Date |
|---|---|---|
| 2,085,761 | Lysholm | July 6, 1937 |
| 1,992,158 | Hall | Feb. 19, 1935 |
| 1,772,196 | Wallace | Aug. 5, 1930 |
| 1,072,663 | Silverston | Sept. 9, 1913 |
| 1,723,479 | Goodrich | Aug. 6, 1929 |
| 1,725,914 | Hallowell | Aug. 27, 1929 |
| 1,904,134 | Hall-Brown | Apr. 18, 1933 |
| 1,697,770 | Kreikenbohm | Jan. 1, 1929 |
| 2,280,835 | Lysholm | Apr. 28, 1942 |

FOREIGN PATENTS

| Number | Country | Date |
|---|---|---|
| 499,004 | Great Britain | Jan. 17, 1939 |
| 504,539 | Great Britain | Apr. 26, 1939 |
| 804,284 | France | July 27, 1936 |